United States Patent [19]

Bolton et al.

[11] Patent Number: 5,119,270
[45] Date of Patent: Jun. 2, 1992

[54] DATA STORAGE SYSTEM WITH DEVICE DEPENDENT FLOW OF COOLING AIR

[75] Inventors: Ivor W. Bolton, Winchester; Albert N. Hamper; David S. Gaunt, both of Southampton; David J. Gray, Romsey, all of England

[73] Assignee: International Business Machines Corporation, Armonk, N.Y.

[21] Appl. No.: 618,781

[22] Filed: Nov. 27, 1990

[51] Int. Cl.$^5$ .............................................. H05K 7/20
[52] U.S. Cl. .................................. 361/384; 361/391; 165/80.3
[58] Field of Search ...................... 165/80.3; 174/16.1; 361/384, 390, 391, 393, 394, 415, 379; D14/100, 102, 109, 114, 115

[56] References Cited

U.S. PATENT DOCUMENTS

| | | | |
|---|---|---|---|
| 2,380,026 | 7/1945 | Clarke | 361/384 X |
| 3,188,524 | 6/1965 | Williams | 361/390 |
| 3,298,195 | 1/1967 | Raskhodoff | 165/80.3 X |
| 3,592,260 | 7/1971 | Berger | 174/16.1 X |
| 4,126,269 | 11/1978 | Bruges | 361/384 X |
| 4,479,263 | 10/1984 | Rosenfeldt et al. | 361/394 X |
| 4,690,286 | 9/1987 | Horne et al. | 361/390 X |
| 4,728,160 | 3/1988 | Mondor et al. | 361/384 X |
| 4,748,540 | 5/1988 | Henneberg et al. | 361/390 X |
| 4,754,397 | 6/1988 | Varaiya et al. | 361/384 X |
| 4,870,643 | 9/1989 | Bultman et al. | 360/98.01 X |
| 4,888,549 | 12/1989 | Wilson et al. | 361/415 X |
| 4,894,749 | 1/1990 | Elko et al. | 361/384 X |
| 4,937,806 | 6/1990 | Babson et al. | 361/391 X |

OTHER PUBLICATIONS

IBM Technical Disclosure, "Machine Base", R. J. Lindner, vol. 16, No. 3, Aug. 1973, p. 905.

*Primary Examiner*—Leo P. Picard
*Assistant Examiner*—Michael W. Phillips
*Attorney, Agent, or Firm*—Andrew J. Dillon

[57] ABSTRACT

A multimedia data storage system including a compartmentalized drawer which can be tailored to accommodate the differing cooling requirements of different device types thus allowing each device type to be mounted in any device position. A cover in the form of a frame having a plurality of openings fits onto the front of the drawer. A first device type includes a front bezel which fills one opening in the cover and is cooled by air passing through a number of holes located along the length of the lower surface of the frame. A second device type is cooled by air passing through a number of holes located along the length of the lower surface of the frame. A second device type is cooled by air passing through a louvred panel located in one opening in the cover. The panel includes a blanking member which blocks off the frame cooling holes located in front of the second device type. Thus, for this device type, there is no air flow through the cooling holes. In addition, noise coming through the holes from inside the drawer is reduced.

7 Claims, 4 Drawing Sheets

DATA STORAGE SYSTEM WITH DEVICE DEPENDENT FLOW OF COOLING AIR

TECHNICAL FIELD OF THE INVENTION

This invention relates to the field of cooling of data storage devices in a data storage system.

BACKGROUND OF THE INVENTION

In the field of mass data storage systems, there is an ongoing requirement to provide large storage capacity while at the same time improving reliability and allowing the customer to tailor such systems to his own requirements. These criteria can be satisfied with known modular system configurations wherein a number of data storage devices, e.g. magnetic disk drives, are mounted side by side in a box which also incorporates cooling fans, a power supply and some form of controller for controlling input and output of data to and from the disk files. Thus is provided a self contained unit capable of storing large amounts of data. The disk drives may be used together to provide higher reliability by, for example, allowing duplication of information or else by increasing storage capacity. If the storage devices are removable this has the added advantage of allowing the user to remove and replace defective devices or to lock away devices containing especially sensitive information.

Enclosing one or more devices and power supply within a single box imposes restrictions on the ability to maintain the devices within safe operating temperatures. Thus forced air cooling will usually be necessary, with the type of cooling system depending on the cooling requirements of the different elements within the box. One example of a modular data storage system is described in EP 320 107 wherein five 5.25 inch disk drives each mounted within a subassembly are removably inserted in the front of a drawer, the rear of which contains a power supply. Cooling of the power supply and devices is provided by two fans fixed into the rear bulkhead of the drawer which pull air past the devices and over the power supply. In such a system because the devices are of the same type, each device presumably has the same cooling requirements and therefore no provision for devices having different cooling requirements is needed.

A second example is described in EP 328 260 wherein two customer removable data storage units are mounted in canisters in the front of a drawer. A power supply and control circuitry are located at the rear of the drawer and separated from the devices by an internal bulkhead. Conventional fans provide forced air cooling of the devices and power supply. Different device types may be housed in the uniform canisters but no modification of the cooling arrangements is provided.

DISCLOSURE OF THE INVENTION

In a multi media data storage system, different device types can be housed in the box e.g. tape drives along side disk drives. Greater system flexibility is provided if the devices are interchangeable. However in such a multi-media system, the cooling system will need to cope with the variety of cooling requirements of the different device types. Prior art data storage systems make no provision for devices having different cooling requirements.

Accordingly, the present invention provides a data storage system including a housing for interchangeably mounting a plurality of data storage devices of at least two types in a corresponding plurality of bays defined within a housing; fan means for causing airflow through the bays past such devices when mounted in the housing; the housing defining a plurality of primary apertures at the front of the bays permitting airflow past a first device type but being obstructed by a second device type, the housing further including secondary apertures which enable airflow past the second type of device.

In this way, when a particular device is of a type which obstructs air flow through the bay in which it is situated, extra provision in the form of secondary apertures in the housing enables air to flow past the device thereby providing adequate cooling.

In one possible system configuration, the devices are inserted into the primary apertures defined by dividing walls within the housing, the front of the devices forming the front surface of the system. In this case, the secondary apertures would be situated in at least one surface of the housing to allow cooling air past the second device type.

However, in a preferred system configuration, the housing comprises a chassis in which the devices are mounted and a cover frame removably attached to the front of the chassis, the primary and secondary apertures being situated in the cover frame.

While a system may be envisaged wherein there are different numbers of devices and primary apertures, it is preferred that there is one primary aperture in the cover frame for each device bay with the front of the second device type fitting into the corresponding aperture in the cover frame. It is further preferred that the frame includes secondary apertures corresponding to each device bay. Thus the means for cooling the devices of the second type is provided for any of the device bays. In an alternative system configuration, complete interchangeability of the devices may be neither necessary nor desirable. Thus it would be necessary to position the secondary cooling holes only where the second device type is capable of being positioned.

A preferred data storage system further includes a removable panel which can be mounted into any one of the primary apertures in the cover frame. When the cover frame is in place at the front of the chassis, the removable panel is mounted into each of the primary apertures corresponding to a bay containing a device of the first type. The removable panel includes openings in its front surface to allow flow of cooling air past the device. On removing a device of the first type to a different bay, it is a simple operation to move the removable panel into the corresponding aperture.

In an alternative configuration, the front portion of the first type of device fits into the corresponding primary aperture and openings in the front surface of the device allow passage of cooling air.

In some system configurations, it may be the case that it is desirable or indeed necessary to allow air through the secondary apertures associated with the first type of device in order to ensure adequate cooling of that device. However, in a preferred system, sufficient cooling is provided by passage of cooling air through the openings in the removable panel (or through the openings in the device front for the system configuration where the front of the first type of device fills the primary aperture). In such a system, it may be desirable to stop the radiation of device and/or cooling fan noise through the secondary apertures. Thus in a preferred system, means are included for blocking off the secondary apertures associated with the primary aperture corresponding to a device position containing a device of the first type.

Blocking of the secondary apertures may be achieved by any one of a number of means e.g. sticky tape. In the system configuration wherein the front of the first device type sits in the primary aperture, part of the device itself may be used to block off the associated secondary apertures in the housing. However in the preferred system configuration including the removable panel, it is preferred that the blocking means comprises a blanking member on the panel. In a preferred system, the secondary apertures are located in a surface of the cover frame which is turned back from the cover frame front surface. The blanking member extends backwards substantially perpendicularly from the panel front surface and blocks off the secondary apertures associated with that device position.

In this way, a device of the first type may be mounted into any device bay with the removable panel located in the corresponding primary aperture acting as a front cover for the device while allowing passage of cooling air through the holes in its front surface, at the same time closing off the secondary apertures associated with that position The second type of device filling the corresponding primary aperture would then be cooled solely by air passing through the open secondary apertures.

The invention will now be described by way of example only with reference to the accompanying drawings.

DETAILED DESCRIPTION OF THE INVENTION

Figure 1:
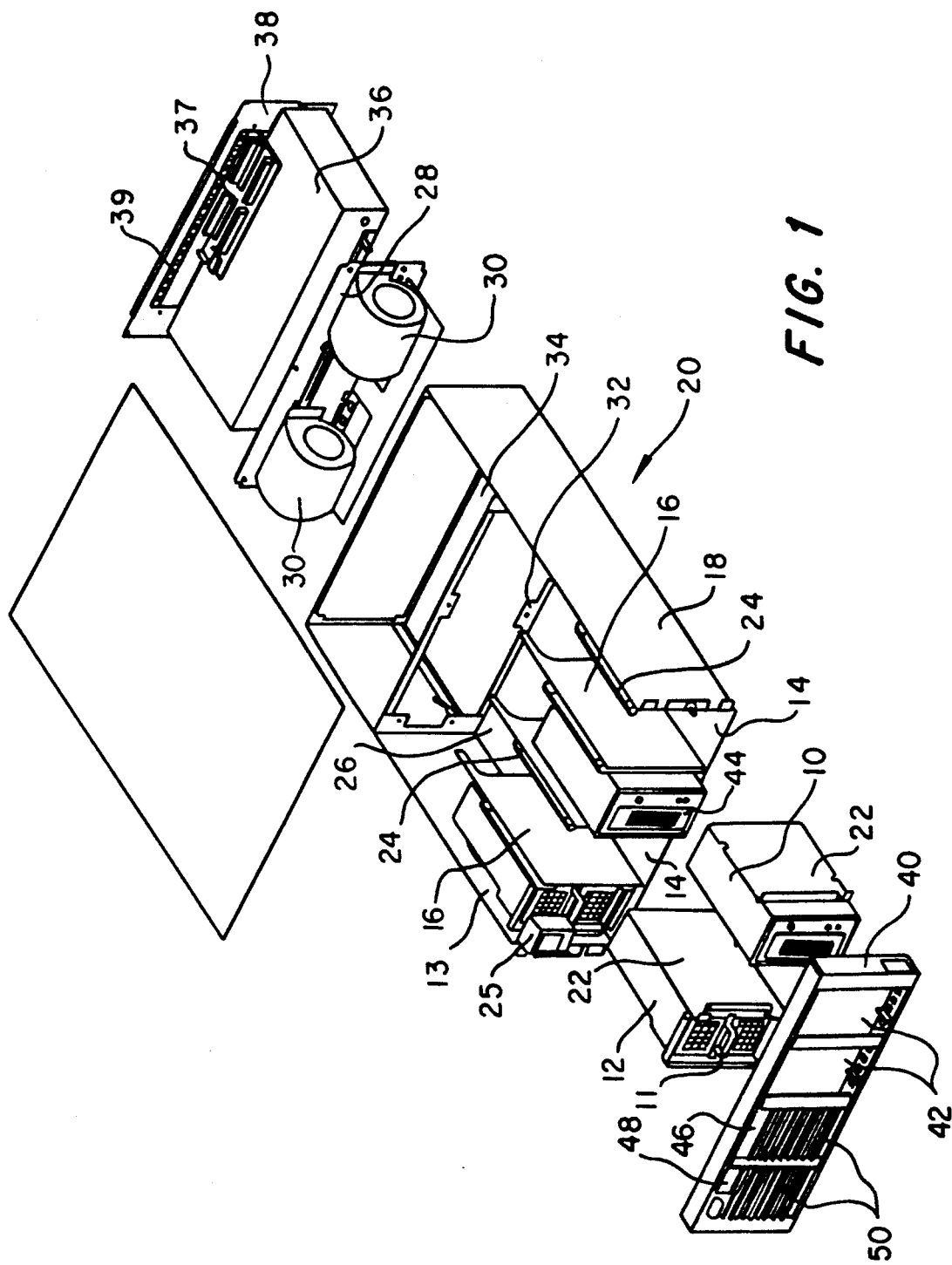
FIG. 1 is an exploded isometric view of a data storage system according to the present invention (with the top cover removed for clarity)

FIG. 1 shows a multi-media data storage system including data storage devices of two different types i.e. tape drive 10 and disk drive 12. Each device is removably mounted into one of four bays 14 defined by dividing walls 16 in a first compartment 18 of a drawer 20. Because each device is of a standard size (5.25 inch form factor), it would be theoretically possible to put a device into any one of the bays. When the drawer of FIG. 1 is assembled, there are two disk drives in the two left hand bays and two tape drives in the two right hand bays. A mounting plate 22 fixed onto the side of each device locates in guide rails 24 fixed to the top and bottom (not shown) inner surfaces of the drawer. A handle 11 on the front of the disk drive is used to insert and remove the unit from the drawer. The system also includes a power switch and indicator lamp in a unit 25 fixed at the front left-hand side of the drawer.

Behind the front compartment of the drawer is a central fan chamber 26, the rear wall of which is defined by a central bulkhead 28 onto which are mounted two dual side entry centrifugal fans 30. The central bulkhead is attached to a picture frame 32 fixed in position in the drawer. Behind the central bulkhead is a third compartment 34 which houses the power supply unit 36 which provides power for the devices and the fans. Providing the interface between the drawer and any external device is a card 37 located above the power supply 36 which includes a number of connectors. Tape cabling (not shown for clarity) attaches to the connectors on the card and passes through the central bulkhead and connects to each of the devices. When the storage system is in operation, cooling air is forced around the devices, through the fans and through and over the power supply, exiting through slots in the rear bulkhead 38 of the drawer, only the upper slots 39 being visible.

Figure 2:
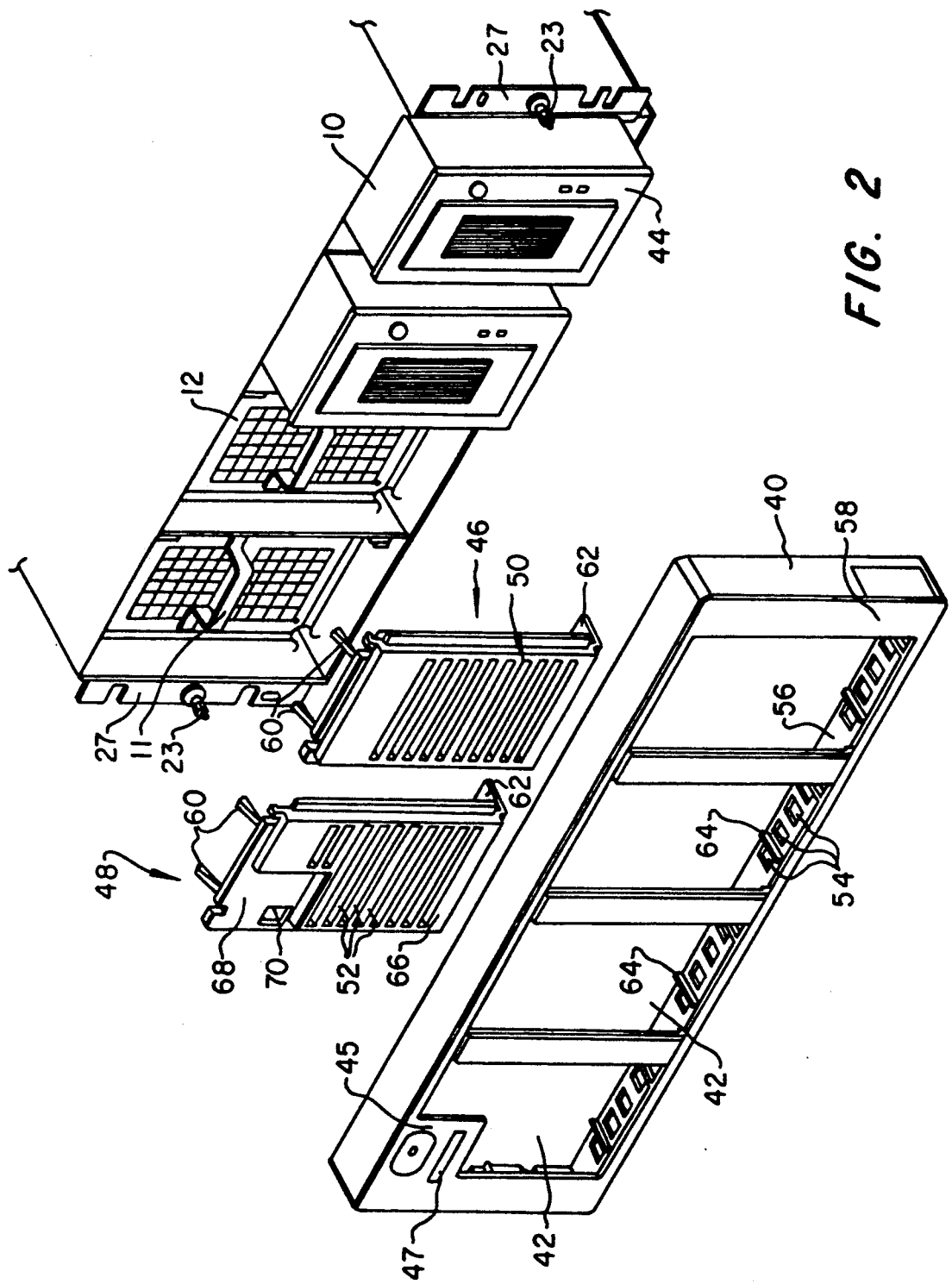
FIG. 2 is an exploded isometric view (looking from the front) of the front part of a data storage system according to the present invention.
Figure 3:
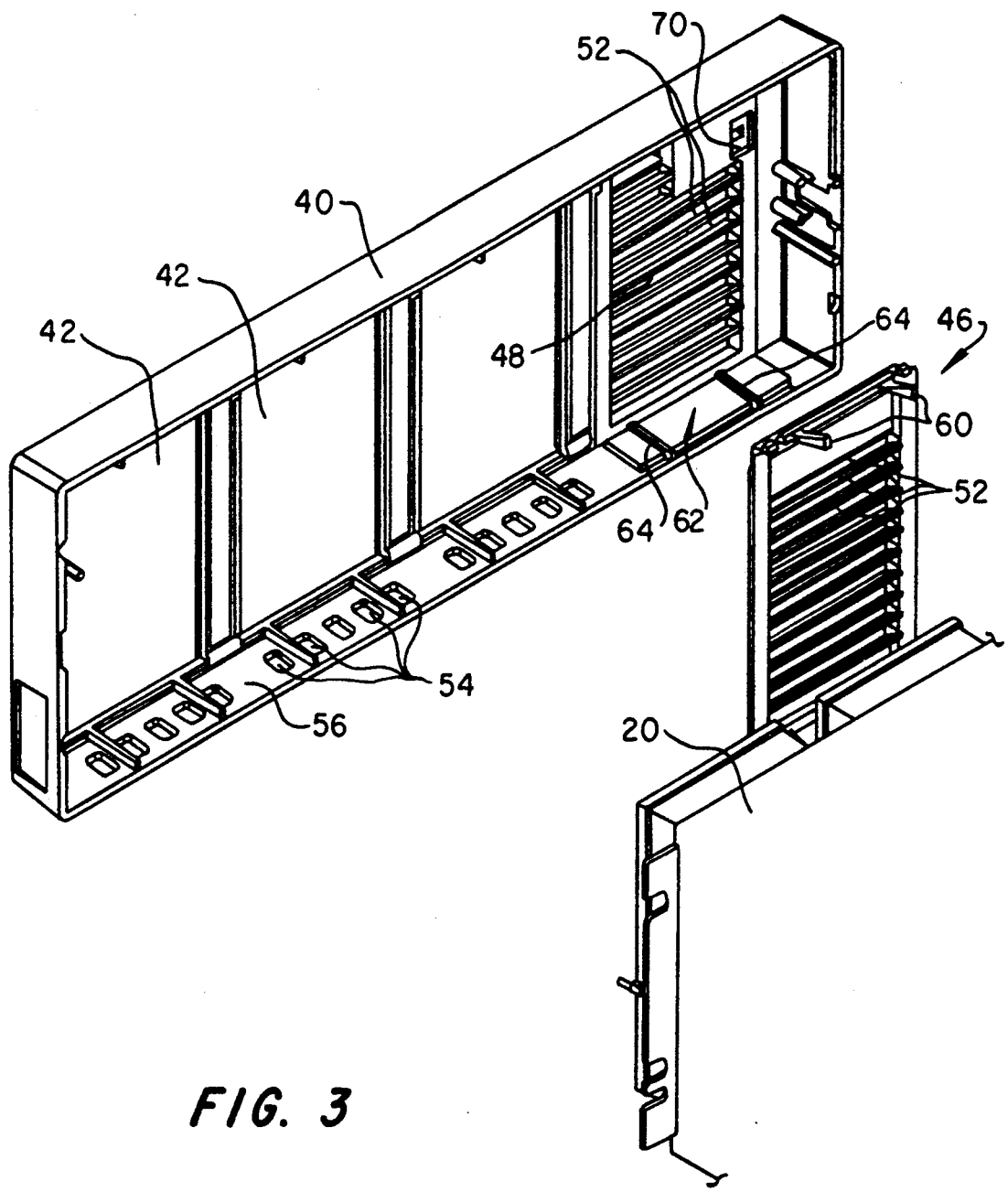
FIG. 3 is an exploded isometric view (looking from the rear) of the front part of a data storage system according to the present invention.
Figure 4:
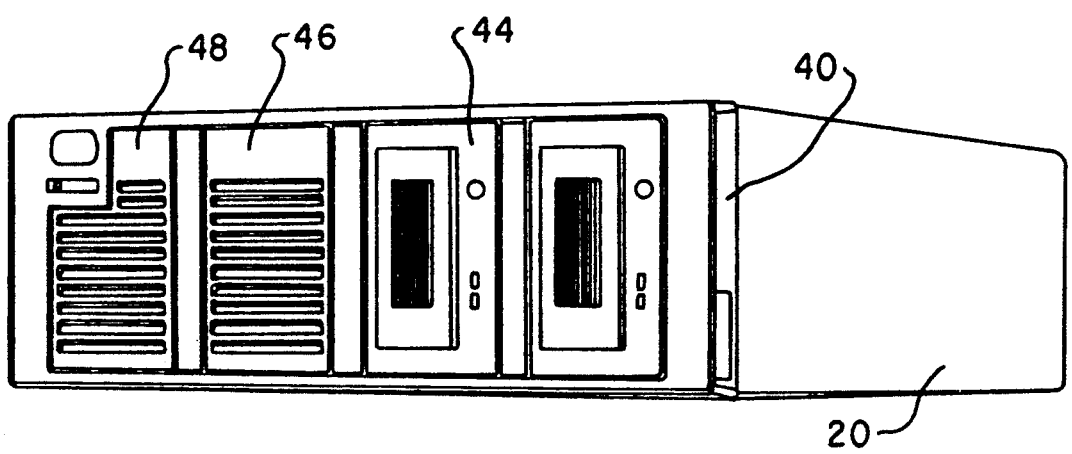
FIG. 4 is a perspective view of a data storage system according to the present invention.

FIGS. 1, 2 and 3 show a cover frame 40 which fits onto the front of the drawer by means of two bullnose catches 23 located on two flanges 27 extending either side of the drawer front. The catches engage with two clips located in the cover frame. The cover frame has four apertures 42, each aperture corresponding to one storage device. In FIG. 2, two tape drives are shown in the rightmost bays, the front surface 44 of each tape drive protruding beyond the front of the drawer. When the drawer is assembled, and the cover frame is fixed to the drawer, the front surface of each tape drive fits into and entirely fills the corresponding aperture. The tape drive front surface sits flush with the front surface of the frame and is visible from the front of the system.

In FIG. 2, it can be seen that each disk drive is mounted in the bay such that a gap is defined between the front of the device and the front of the drawer. In front of each disk drive, a removable snap-in panel 46, 48 fits into the corresponding aperture in the cover frame. Each snap-in panel includes a louvred portion 50 comprising a number of horizontal slots 52 through which air passes to cool the disk drive when in operation.

Because the indicator unit 25 (shown in FIG. 1 but omitted from FIGS. 2 and 3 for clarity) obscures part of the leftmost bay at the drawer front, it is not possible in the embodiment shown to position a tape drive in that particular bay. A disk drive sits in the leftmost bay, with the unit 25 taking up some of the space between the front of the drive and the front of the drawer. As can be seen in any of the FIGURES, the shape of the leftmost aperture in the cover frame is modified by the inclusion of a corner portion 45 in the frame. Included in this portion is a viewing slot 47 through which the indicator lamp in unit 25 can be seen. The snap-in panel 48, described in more detail below, is suitably shaped to fit the modified aperture In a different system design wherein there is no necessity to include a similar corner portion, and wherein the dimensions of each aperture are identical, then it would be possible to mount each device into any of the drawer device positions.

FIGS. 2 and 3 show the frame and snap-in panel in more detail. As can be seen in FIG. 2, twenty holes 54 (divided into four groups of five) are cut into the lower turned back surface 56 of the frame, perpendicular to the front surface 58. As can be seen in FIG. 3, each group of holes corresponds to one device aperture (one of the groups is obscured by panel 48).

Each snap in panel 46, 48 has a pair of resilient tangs 60 extending backwards from the top of the panel front surface. When the panel is mounted in the frame the tangs are forced downwards and engage with corresponding features on the top inner surface of the cover frame. Extending from the bottom of each panel front surface is a substantially flat member 62, divided into three sections by two slots. When the panel is mounted in the frame (shown in FIG. 3) the three sections engage with the lower inner surface of the frame, the slots mating with two raised ridges 64 in the frame lower surface thereby locating the panel correctly in the frame. In this way the flat member blocks off one of the four groups of holes in the cover frame, the central section covering the three holes between the ridges and the two outer sections each covering one of the holes.

For the reasons already described, snap-in panel 48 has a different shape to the other panel type 46. The louvred front portion (66) is reverse 'L' shaped and stands proud of a flat portion 68 including an oblong shaped aperture 70 through which the indicator lamp can be seen at the front of the system. Panel 48 fits into the frame in the same way as the other panel type 46, the flat portion sitting behind the corner portion 45 of the cover frame.

The data storage system is assembled as follows; the devices are connected to signal and power cables (not shown) from the rear, inserted into the desired bay positions and secured in place. Each snap-in panel is mounted in the cover frame in the aperture corresponding to each disk drive position and then the cover frame is fixed onto the chassis. As has been described previously, the front of each tape drive sits in its corresponding device aperture.

When the data storage system is in operation, each disk drive is cooled by air passing through the louvred portion 50 in the corresponding panel. Air passes through a grille behind handle 11 and around the device through the gaps 13 between the disk drive and the walls of the bay in which the disk drive is located Because the tape drive entirely fills the corresponding aperture in the frame and there are no openings in the front of the tape drive, the method of cooling used for the disk drives is not possible The fans draw air through the five cooling holes 54 in the lower surface of the cover frame and along the lower surface of the tape drive. A baffle located in the lower surface of the drawer deflects the cooling air passing along the lower surface of the tape drive over heat producing electronic components on circuit boards at the rear of the tape drive. In embodiments other than that described herein, suitably placed baffles could deflect cooling air wherever it is required.

In the embodiment described, sufficient cooling of the disk drive is obtained by the passage of air through the louvred section of the snap-in panel and flow of cooling air through the frame cooling holes is not required Noise emanating from both fan and device radiates from these holes. In order to reduce the amount of noise at the front of the drawer, it is thus desirable that the secondary holes 54 associated with each disk drive position should be blocked off. This is achieved by means of blanking plate 62 as already described Other provision, not detailed here, may be required to reduce the amount of noise radiating from the louvred section of each removable panel.

In some multimedia systems it may be that a particular device does include air intakes in its front surface but these are not sufficient to cool the device satisfactorily. In this case the frame cooling holes may be used to assist with the cooling of the device, the cooling holes being designed to provide adequate cooling while reducing the amount of noise radiating from these holes.

While the embodiment described shows two tape and disk drives it will be apparent that this invention would prove equally effective in drawers containing a different combination of the two types of device. The system could also incorporate other types of storage device not described e.g. optical disk drives.

We claim:

1. A multimedia date storage system comprising:
   a housing adapted to interchangeably mount a plurality of data storage devices of at least two different types within a corresponding plurality of bays within said housing;
   ventilation means within said housing for causing airflow through said plurality of bays;
   a cover frame attached to said housing having a plurality of primary apertures adapted to permit substantial airflow through bays while having a first type of data storage device mounted therein and having a plurality of secondary apertures adapted to permit substantial airflow through bays while having a second type of data storage device mounted therein; and
   means adapted to selectively block particular ones of said plurality of secondary apertures associated with selected bays having said first type of data storage device mounted therein wherein airflow within each of said plurality of bays may be optimized for a selected type of data storage device.

2. The multimedia data storage system according to claim 1, wherein said cover frame includes one primary aperture in association with each of said plurality of bays.

3. The multimedia data storage system according to claim 1, wherein said cover frame includes at least one secondary aperture in association with each of said plurality of bays.

4. The multimedia data storage system according to claim 1, wherein said means adapted to selectively block particular ones of said plurality of secondary apertures comprises at least one removable panel adapted to be mounted within a selected primary aperture within said cover frame and having a blanking member for blocking particular ones of said plurality of said secondary apertures disposed adjacent to said selected primary aperture.

5. The multimedia data storage system according to claim 4, wherein said at least one removable panel includes a plurality of horizontal slots disposed therein.

6. The multimedia data storage system according to claim 1, wherein said ventilation means comprises an electric fan disposed within said housing.

7. The multimedia data storage system according to claim 1, wherein each of said plurality of primary apertures is disposed within a first plane and wherein each of said plurality of secondary apertures is disposed perpendicular to said first plane.

* * * * *

UNITED STATES PATENT AND TRADEMARK OFFICE
CERTIFICATE OF CORRECTION

PATENT NO. : 5,119,270

DATED : June 2, 1992

INVENTOR(S) : Bolton et al.

It is certified that error appears in the above-identified patent and that said Letters Patent is hereby corrected as shown below:

In Claim 1, Column 6, line 13, please delete "date" and insert --data--

Signed and Sealed this

Twenty-first Day of September, 1993

Attest:

BRUCE LEHMAN

Attesting Officer

Commissioner of Patents and Trademarks